United States Patent                                                [11] 3,613,107

| [72] | Inventor | Erman V. Cavagnero<br>Torrington, Conn. |
|---|---|---|
| [21] | Appl. No. | 886,216 |
| [22] | Filed | Dec. 18, 1969 |
| [23] | | Division of Ser. No. 706,217, Feb. 12, 1968, Pat. No. 3,522,644, Continuation-in-part of Ser. No. 473,948, July 2, 1965, abandoned |
| [45] | Patented | Oct. 12, 1971 |
| [73] | Assignee | Torin Corporation<br>Torrington, Conn. |

[54] PREHEATING AND SURFACE PREPARATION FOR WELDING
3 Claims, 3 Drawing Figs.

[52] U.S. Cl. ............................................. 219/105, 29/497, 219/67, 219/104

[51] Int. Cl. ........................................... B23k 11/02
[50] Field of Search ................................. 219/104, 105, 101, 107, 64, 67, 50; 29/483, 488, 494, 497

[56]                References Cited
              UNITED STATES PATENTS

| 1,439,962 | 12/1922 | Kamper | 219/67 X |
| 3,210,840 | 10/1965 | Ulam | 29/488 |
| 3,289,293 | 12/1966 | Stenquist et al. | 29/488 X |
| 3,500,532 | 3/1970 | Lozano | 29/470.1 |

Primary Examiner—J. V. Truhe
Assistant Examiner—L. A. Schutzman
Attorney—Paulding & Huber McCormick ABSTRACT: A welding method including a preparation step in the form of a scraping operation carried out in quick sequence with welding. Preheating is also accomplished with cold ends for minimal oxidation.

PATENTED OCT 12 1971 3,613,107

INVENTOR.
ERMAN V. CAVAGNERO
BY
McCormick Paulding & Huber
ATTORNEYS

PREHEATING AND SURFACE PREPARATION FOR WELDING

CROSS REFERENCE TO RELATED APPLICATIONS

This application is divided from U.S. application Ser. No. 706,217 entitled WELDING METHOD FOR BEARING RACES AND OTHER ARTICLES, filed Feb. 12, 1968, now U.S. Pat. No. 3,522,644, issued Aug. 4, 1970 which application was a Continuation-in-Part of copending U.S. Pat. application, Ser. No. 473,948 filed July 22, 1965, now abandoned, and entitled METHOD FOR MAKING WELDED BEARING RACES AND OTHER ARTICLES. An object of the present invention is to provide an improved welding method including a quick sequence scrape and weld operation and an intermediate preheating step with ends to be welded maintained in a cold condition for minimal oxidation.

Figure 1:
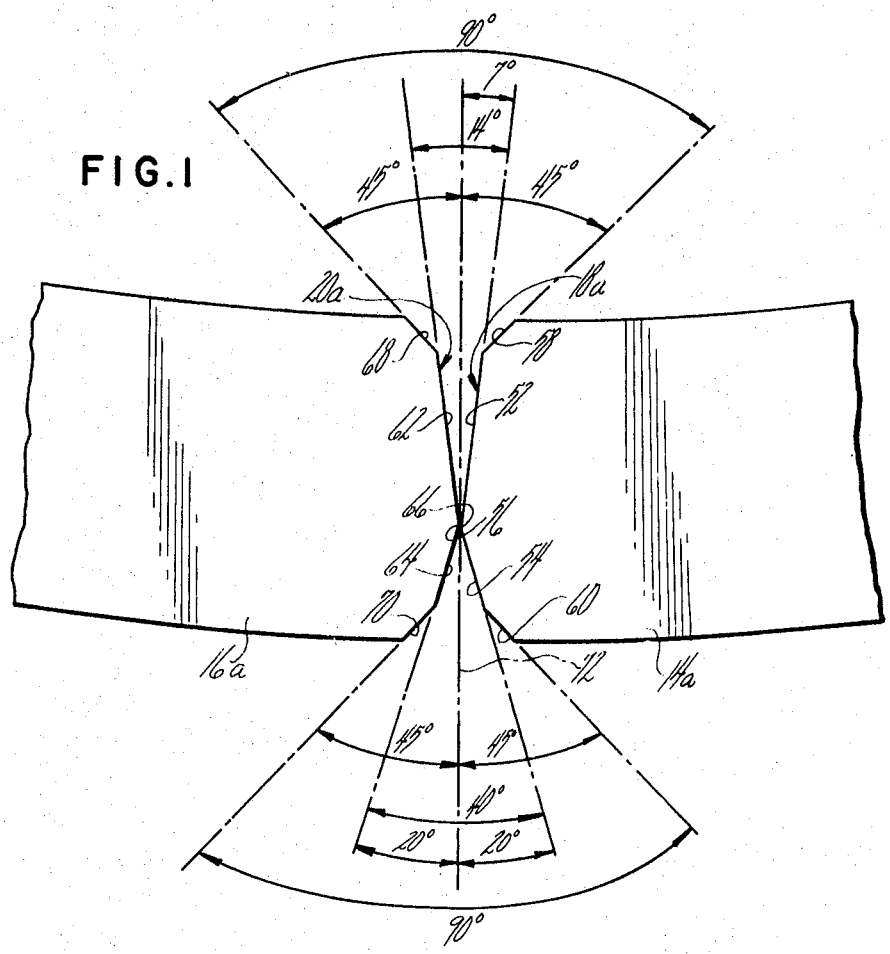
FIG. 1 is an enlarged somewhat schematic view showing the configuration of end surfaces of a bearing race.

Referring particularly to FIG. 1, it will be observed that end portions 14a, 16a representative of a bearing race include end surfaces 18a, 20a in the form of generally V-shaped projections. Short outermost sections of the surfaces are cut back at angles substantially greater than the major portions of the surfaces. Thus, surface 18a comprises faces 52, 54 extending in opposite directions from apex 56 and short cutback outermost sections 58, 60. Similarly, the surface 20a has faces 62, 64 extending in opposite directions from apex 66 and short cutback outermost sections 68, 70. Faces 52, 62, extending from the apexes 56, 66 toward the internal surface of the race are each inclined approximately 7° from a normal plane 72 to define an included angle of 14° and the outermost cutback sections 58, 68 are each inclined approximately 45° from the plane 72 to define an included angle of 90°. Faces 54, 64, extending from the apexes toward the external surface of the race are each inclined approximately 20° from the plane 72 to define an included angle of 40° and the outermost sections 60, 70 are inclined at approximately 45° from plane 72 to define an included angle of 90°. The position of the apexes 56, 66, as shown, is considerably closer to the external surface of the race than the internal surface thereof and is approximately one-third of the total distance between said surfaces.

In broad form, shaping of end surfaces as described above may comprise the provision of at least one end surface with a generally V-shaped projection which may have a sharp or slightly flattened apex. Preferably, and as shown, each surface is provided with a V-shaped projection and the apexes thereof are engaged under substantial pressure with an electrical current passing through the area of engagement to weld progressively outwardly and to displace impurities progressively outwardly. Included angles between individual faces of the projections may vary, but it is believed that a range of 5° to 50° should be maintained for good results in weld strength, outward displacement of impurities, and control of upset. The illustrated inner and outer included angles of 14° and 40° provide excellent results in this regard and, together with the off-center positioning of the apexes 56, 66, such angles provide a particular upset condition which is desired in the present instance, i.e. substantially all of the upset occurs at the inner race surface with little or no upset at the outer surface. The provision of the short cutback sections 58, 68, and 60, 70 affords design freedom in the selection of desired included angles between the faces 52, 62 and 54, 64 and yet provides for upset control in the creation of additional void space for the reception of upset metal.

As will be apparent from the foregoing, extremely high pressures result at initial stages of welding due to the provision of substantial line contact between the surfaces to be welded. It is believed that welding pressures, calculated on the total cross-sectional area of the surfaces to be joined, should be maintained in the range between 10,000 p.s.i., and 30,000 p.s.i., and excellent results have been obtained in the example at hand with a pressure of approximately 15,700 p.s.i. At 15,700 p.s.i., calculated on total cross-sectional area, initial pressure with substantial line contact is of course extremely high and in the neighborhood of one million five hundred thousand pounds per square inch.

Figure 2:
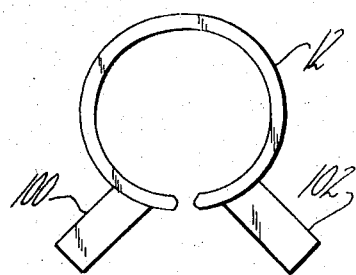
FIG. 2 is a somewhat schematic view showing a bearing race and associated electrodes during preheating.
Figure 3:
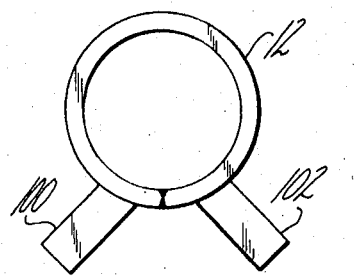
FIg. 3 is a somewhat schematic view showing a bearing race and associated electrodes during welding.

In FIGS. 2 and 3 bearing races are shown schematically in association with electrodes employed in resistance upset butt welding. Thus, a bearing race 12 is shown in FIG. 2 with associated electrodes 100, 102 in engagement therewith for a preheating step, the end portions of the race being spaced apart to provide for current flow through a substantial rear or upper portion of the race with the end portions maintained relatively cold. In FIG. 3 the electrodes are again shown in engagement with the race but with the end portions urged together whereby to provide for current flow through the relatively shorter path formed thereby and to accomplish welding together of the said end portions.

Factors of time are significant in the method of the present invention as indicated. Oxidation at surfaces to be welded of course results in detrimental effects on the completed weld and is to be avoided. While oxidation is somewhat slower at a relatively cold surface, it is nevertheless an important factor for consideration. Thus, the total time which elapses in preparation of surfaces such as 18a, 20a is of significance. Surface preparation steps may include a metal cutting operation which creates the surfaces 18a and 20a, a scraping operation or step, and a shaping step. The entire surface preparation step including all three operations or subsidiary steps should be limited in time. It is believed that a maximum time interval of 2 minutes between commencement of the surface preparation step and commencement of the welding step should be established. Further, 30 seconds is deemed a more realistic limit. In a commercial example, approximately 3 seconds will be consumed between commencement of the metal cutting operation and the completion of welding. With such a 3 second time interval, it is believed that no problem of oxidation at the end surfaces 18a, 20a will be encountered.

A scraping or broaching step takes place prior to the completion of the forming step as illustrated in FIG. 2 in the present example of the method. The time lapse between completion of scraping and commencement of the preheating step will be less than 60 seconds, preferably less than 5 seconds and will approximate 1 second. Thus, a clean, freshly exposed metallic surface will be presented for welding with little or no opportunity for oxidation or other contamination of the surface.

A very important time factor exists in connection with the interval between preheating and welding in the example set forth above. Oxidation at the end surfaces 18a, 20a must be prevented 6 for a good weld and, in addition, cooling of the "remaining portion" by conduction to the relatively cool end portions 14a, 16a may result in localized "quenches" and the formation of "quench cracks" at a localized area or region of martensite if the time interval is too great. Thus, preheating and welding steps must take place in rapid succession both for the prevention of oxidation at the end surface 18a, 20a and for the prevention of quench cracks and hard cracks. It is believed that no more than 1 minute should be permitted to pass in the interval between completion of preheating and the commencement of welding and a limit of 30 seconds is to be desired. In the present example, the bearing race was heated for approximately one-third of a second during preheating, an interval of approximately one-sixth of a second occurred between preheating and welding, and approximately one-fourth of a second was consumed in the welding step.

I claim:

1. A method for welding two surfaces of one or more articles comprising the steps of removing a thin layer of material from the surfaces to provide clean freshly exposed faces, selectively preheating the article or articles on which said surfaces reside while maintaining said surfaces relatively cold with respect to the parts of the article or articles preheated to minimize oxidation, and welding the surfaces together within 5 seconds of completion of the material removing step to minimize oxidation.

2. A method for welding two surfaces as set forth in claim 1 wherein welding occurs within 2 seconds of completion of the material removing step.

3. A method as set forth in claim 1 wherein said surfaces comprise end surfaces to be welded together on a bearing race or other closed loop article, wherein said end surfaces are maintained in spaced relationship during said material removing step, wherein said surfaces are maintained in spaced relationship and an electrical current is passed through the race to preheat selectively maintaining end surfaces relatively cold, and wherein said end surfaces are thereafter urged into engagement and an electrical current is passed therethrough for welding the same together.